United States Patent
Agarwal et al.

(10) Patent No.: US 11,941,760 B2
(45) Date of Patent: Mar. 26, 2024

(54) METHOD AND SYSTEM FOR GENERATING 3D MESH OF A SCENE USING RGBD IMAGE SEQUENCE

(71) Applicant: Tata Consultancy Services Limited, Mumbai (IN)

(72) Inventors: Swapna Agarwal, Kolkata (IN); Soumyadip Maity, Kolkata (IN); Hrishav Bakul Barua, Kolkata (IN); Brojeshwar Bhowmick, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 83 days.

(21) Appl. No.: 17/807,339

(22) Filed: Jun. 16, 2022

(65) Prior Publication Data
US 2023/0063722 A1    Mar. 2, 2023

(30) Foreign Application Priority Data
Jul. 27, 2021    (IN) .............................. 202121033776

(51) Int. Cl.
*G06T 17/20*    (2006.01)
*G06T 7/70*    (2017.01)

(52) U.S. Cl.
CPC ................ *G06T 17/20* (2013.01); *G06T 7/70* (2017.01); *G06T 2207/10024* (2013.01)

(58) Field of Classification Search
CPC ................................. G06T 17/05; G06T 17/10
See application file for complete search history.

(56) References Cited

U.S. PATENT DOCUMENTS 8,933,925 B2    1/2015  Sinha et al.
2020/0372710 A1*  11/2020  Wang ..................... B33Y 50/00
(Continued)

OTHER PUBLICATIONS

Ashutosh Saxena et al., "Make3D: Learning 3D Scene Structure from a Single Still Image," IEEE Transactions on Pattern Analysis and Machine Intelligence, 2009, vol. 31, Issue: 5, pp. 824-840, IEEE, http://www.cs.cornell.edu/~asaxena/reconstruction3d/saxena_make3d_learning3dstructure.pdf.
(Continued)

*Primary Examiner* — Samantha (Yuehan) Wang
(74) *Attorney, Agent, or Firm* — FINNEGAN, HENDERSON, FARABOW, GARRETT & DUNNER, LLP (57) ABSTRACT

Traditional machine learning (ML) based systems used for scene recognition and object recognition have the disadvantage that they require huge quantity of labeled data to generate data models for the purpose of aiding the scene and object recognition. The disclosure herein generally relates to image processing, and, more particularly, to method and system for generating 3D mesh generation using planar and non-planar data. The system extracts planar point cloud and non-planar point cloud from each RGBD image in a sequence of RGBD images fetched as input, and then generates a planar mesh and a non-planar mesh for planar and non-planar objects in the image. A mesh representation is generated by merging the planar mesh and the non-planar mesh. Further, an incremental merging of the mesh representation is performed on the sequence of RGBD images, based on an estimated camera pose information, to generate representation of the scene.

9 Claims, 10 Drawing Sheets

(56) References Cited

U.S. PATENT DOCUMENTS

2021/0064791 A1* 3/2021 Wu .................. G06F 30/25
2022/0375170 A1* 11/2022 Osokin .................. G06F 30/13

OTHER PUBLICATIONS

Chen Liu et al., "PlaneRCNN: 3D Plane Detection and Reconstruction from a Single Image," Computer Vision and Pattern Recognition, 2019, Arxiv, https://arxiv.org/pdf/1812.04072.pdf.

Junyi Pan et al., "Deep Mesh Reconstruction from Single RGB Images via Topology Modification Networks," Computer Vision and Pattern Recognition, 2019, Arxiv, https://arxiv.org/pdf/1909.00321.pdf.

Chen Liu et al., "PlaneNet: Piece-wise Planar Reconstruction from a Single RGB Image," Computer Vision and Pattern Recognition, Apr. 2018, Arxiv, https://arxiv.org/pdf/1804.06278.pdf.

Chandrajit L. Bajaj et al., Surface and 3D Triangular Meshes from Planar Cross Sections, Title of the item: Computer Science, 1996, Semnatic Scholar, https://people.eecs.berkeley.edu/~jrs/meshpapers/BajajCoyleLin.pdf.

Olga Nechaeva, "Using Self Organizing Maps for 3D surface and volume adaptive mesh generation," In book: Self-Organizing Maps, 2006, Intechopen, https://cdn.intechopen.com/pdfs/10457/InTech-Using_self_organizing_maps_for_3d_surface_and_volume_adaptive_mesh_generation.pdf.

Zhujiang Wanga et al., "FlowMesher: An automatic unstructured mesh generation algorithm with applications from finite element analysis to medical simulations," Graphics, Mar. 2021, Arxiv https://arxiv.org/pdf/2103.05640.pdf.

Carmelo Mineo et al., "Novel algorithms for 3D surface point cloud boundary detection and edge reconstruction," Journal of Computational Design and Engineering, 2018, vol. 6, Issue: 1 pp. 81-91, Science Direct, https://www.sciencedirect.com/sdfe/reader/pii/S2288430017302117/pdf.

Pengcheng Shi et al., "A Novel Indoor Structure Extraction Based on Dense Point Cloud," International Journal of Geo-Information, 2020, vol. 9, Issue: 11, MDPI, https://www.mdpi.com/2220-9964/9/11/660.

Ariel Shamir, "Segmentation and Shape Extraction of 3D Boundary Meshes," Eurographics, 2006, diglib, https://diglib.eg.org/bitstream/handle/10.2312/egst.20061056.137-149/137-149.pdf?sequence=1&isAllowed=y.

Ferdinand Kickinger, "Automatic Mesh Generation for 3D Objects," Automatic Mesh Generation for 3D Objects, 1996, Research Gate, https://www.researchgate.net/publication/2643897_Automatic_Mesh_Generation_for_3D_Objects/link/0de ec529487cad6fbe000000/download.

* cited by examiner

METHOD AND SYSTEM FOR GENERATING 3D MESH OF A SCENE USING RGBD IMAGE SEQUENCE

PRIORITY CLAIM

This U.S. patent application claims priority under 35 U.S.C. § 119 to: Indian Patent Application No. 202121033776, filed on Jul. 27, 2021. The entire contents of the aforementioned application are incorporated herein by reference.

TECHNICAL FIELD

The disclosure herein generally relates to image processing, and, more particularly, to method and system for generating 3D mesh.

BACKGROUND

Image/video processing to reconstruct 3-Dimensional (3D) scenes is a technique with a wide range of applications. One of the applications is in the field of robotics. With the advancement of Artificial Intelligence, robots are becoming usable for various complicated tasks. These robots enable a human to operate the robot from remote location. Both telepresence and teleoperation require a good structural representation of the scene to allow users for virtual navigation or manipulation on the remote environment. These robots find application in remote teacher/meeting/surveillance etc. Telepresence robots are in much demand for hospital setups to mitigate the physical communication of medical staffs with patients.

For example, when a robot is deployed in a warehouse for automated inventory management, the robot is required to move around in the warehouse, identify an object being searched, and then perform pick and place operations as required.

Learning models being used by the state-of-the-art systems require training on a huge labeled dataset for generating the mesh, and in turn a 3D world model. Generating such labeled data, especially when quantity of the data is huge, is a task requiring considerable efforts. Further, the scene being reconstructed may contain planar as well as non-planar objects. The state-of-the-art techniques use techniques such as but not limited to CAD, to represent the non-planar objects. However, in a practical scenario, generating the representations using such techniques is infeasible.

SUMMARY

Embodiments of the present disclosure present technological improvements as solutions to one or more of the above-mentioned technical problems recognized by the inventors in conventional systems. For example, in one embodiment, a processor implemented method of mesh surface reconstruction of a scene is provided. In this method, initially a sequence of RGBD images of the scene is fetched, via one or more hardware processors. Further, a mesh representation of each of the plurality of images in the sequence of RGBD images is generated, via the one or more hardware processors. The mesh representation for each of the images is generated by executing the following steps: Initially, planar point cloud and non-planar point cloud are segregated from the image by performing a plane segregation on the image and using a depth map and pose information of the image. Object segmentation techniques can be used to extract point cloud corresponding to each non-planar object in the image. Further, a planar mesh is generated from the planar point cloud, and a non-planar mesh is generated for non-planar objects in the image. Further, the planar mesh and the non-planar mesh are merged to generate a combined mesh. This combined mesh acts as the mesh representation of each of the images. Further, a camera pose information is estimated by performing plane matching and pose estimation on each two consecutive images in the sequence of images via the one or more hardware processors. Further, an incremental merging of the generated mesh representation of the plurality of images is performed using the estimated camera pose information, to generate a representation of the scene captured in the sequence of RGBD images, via the one or more hardware processors. In this method, generating the planar mesh from the planar point cloud involves the following steps. Initially, a rotation matrix is calculated for each plane in the planar point cloud. Further, a 2-D image is obtained by aligning each of the planes in the planar point cloud parallel to an X-Y plane, by rotating each of the planes with respect to the X-Y plane based on values in the rotation matrix. Further, the planar mesh is obtained from the 2-D image. Also, the non-planar mesh is generated using the following steps. A point cloud of a non-planar object in the image is localized from the non-planar data. Further, a mesh is generated for the localized point cloud of the non-planar object, and boundary nodes and inner nodes of the mesh are segregated. The mesh has fixed number of nodes and known connectivity between the nodes. Further, a plurality of points in the point cloud of the object are segregated into boundary points and inner points, wherein for each of the boundary points nearest mesh node of the generated mesh is a boundary node and for each of the inner points nearest mesh node is an inner node. Further, the boundary nodes of the mesh near the boundary of the object are extended to connect with the boundary points of the object.

In another aspect, a system for mesh surface reconstruction of a scene is provided. The system includes one or more hardware processors, an I/O interface, and a memory. The stores a plurality of instructions, which when executed, cause the one or more hardware processors to initially fetch a sequence of RGBD images of the scene. The system then generates a mesh representation of each of the plurality of images in the sequence of RGBD images. The mesh representation for each of the images is generated by executing the following steps: Initially, planar point cloud and non-planar point cloud are segregated from the image by performing a plane segregation on the image and using a depth map and pose information of the image. Object segmentation techniques can be used to extract point cloud corresponding to each non-planar object in the image. Further, a planar mesh is generated from the planar data, and a non-planar mesh is generated for each non-planar object in the image. Further, the planar mesh and the non-planar mesh are merged to generate a combined mesh. This combined mesh acts as the mesh representation of each of the images. Further, a camera pose information is estimated by performing plane matching and pose estimation on each two consecutive images in the sequence of images. Further, an incremental merging of the generated mesh representation of the plurality of images is performed using the estimated camera pose information, to generate a representation of the scene captured in the sequence of RGBD images. The system generates the planar mesh from the planar point cloud involves the following steps. Initially, a rotation matrix is calculated for each plane in the planar point cloud. Further, a 2-D image is obtained by aligning each of the planes in the planar data parallel to an X-Y plane, by rotating each of the planes with respect to the X-Y plane based on values in the rotation matrix. Further, the planar mesh is obtained from the 2-D image. The system generates the non-planar mesh using the following steps. A point cloud of a non planar object in the image is localized from the image. Further, a mesh is generated for the localized point cloud, and boundary nodes and inner nodes of the mesh are segregated. The mesh has fixed number of nodes and known connectivity between the nodes. Further, a plurality of points in the point cloud of the object are segregated into boundary points and inner points, wherein for each of the boundary points nearest mesh node of the generated mesh is a boundary node and for each of the inner points nearest mesh node is an inner node. Further, the boundary nodes of the mesh near the boundary of the object are extended to connect with the boundary points of the object.

In yet another aspect, a non-transitory computer readable medium for of mesh surface reconstruction of a scene is provided. The non-transitory computer readable medium includes a plurality of instructions, which when executed, cause the one or more hardware processors to perform the following steps. Initially a sequence of RGBD images of the scene is fetched. Further, a mesh representation of each of the plurality of images in the sequence of RGBD images is generated. The mesh representation for each of the images is generated by executing the following steps: Initially, planar point cloud and non-planar point cloud are segregated from the image by performing a plane segregation on the image and using a depth map and pose information of the image. Object segmentation techniques can be used to extract point cloud corresponding to each non-planar object in the image. Further, a planar mesh is generated from the planar point cloud, and a non-planar mesh is generated for non-planar objects in the image. Further, the planar mesh and the non-planar mesh are merged to generate a combined mesh. This combined mesh acts as the mesh representation of each of the images. Further, a camera pose information is estimated by performing plane matching and pose estimation on each two consecutive images in the sequence of images. Further, an incremental merging of the generated mesh representation of the plurality of images is performed using the estimated camera pose information, to generate a representation of the scene captured in the sequence of RGBD images. In this method, generating the planar mesh from the planar point cloud involves the following steps. Initially, a rotation matrix is calculated for each plane in the planar point cloud. Further, a 2-D image is obtained by aligning each of the planes in the planar point cloud parallel to an X-Y plane, by rotating each of the planes with respect to the X-Y plane based on values in the rotation matrix. Further, the planar mesh is obtained from the 2-D image. Also, the non-planar mesh is generated using the following steps. A point cloud of the non-planar object is localized from the image. Further, a mesh is generated for the localized point cloud, and boundary nodes and inner nodes of the mesh are segregated. The mesh has fixed number of nodes and known connectivity between the nodes. Further, a plurality of points in the point cloud of the object are segregated into boundary points and inner points, wherein for each of the boundary points nearest mesh node of the generated mesh is a boundary node and for each of the inner points nearest mesh node is an inner node. Further, the boundary nodes of the mesh near the boundary of the object are extended to connect with the boundary points of the object.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Many applications require capability to automatically interpret scenes or environments. For example, in robotics domain, when multiple robots are deployed in an environment to perform specific tasks, the robots may have to identify and interpret the environment to be able to carry out the tasks. For example, if the robots are deployed in a warehouse and are required to pick and place objects in different racks in the warehouse, the robots must be able to a) move around in the warehouse, b) identify various objects placed in different racks, and c) perform the pick/place operations. This is possible only if the robots have capability to interpret the scene/environment using a feed of images or video captured using appropriate sensors such as a camera. The embodiments herein disclose a method and system for 3D mesh generation of a scene, using planar and non-planar point clouds from RGBD images.

Referring now to the drawings, and more particularly to FIG. 1 through FIG. 8B, where similar reference characters denote corresponding features consistently throughout the figures, there are shown preferred embodiments and these embodiments are described in the context of the following exemplary system and/or method.

Figure 1:
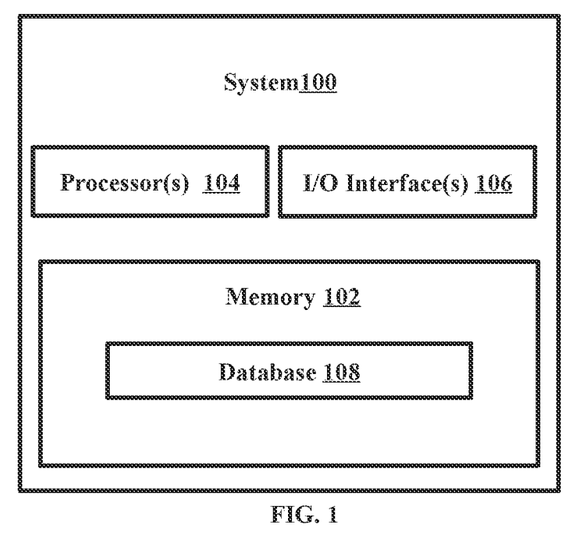
FIG. 1 illustrates an exemplary system for mesh surface reconstruction of a scene, according to some embodiments of the present disclosure.

FIG. 1 illustrates an exemplary system for mesh surface reconstruction of a scene, according to some embodiments of the present disclosure. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes a database 108 that stores all data associated with the mesh surface reconstruction (alternately referred to as "mesh approximation") being performed by the system 100. For example, the database 108 stores the configurable instructions that are executed to cause the one or more hardware processors 104 to perform various steps associated with the mesh surface reconstruction. The database 108 may further store all data that is collected as input for the purpose of the mesh surface reconstruction, data generated as intermediate results while reconstructing the mesh of a scene such as but not limited to planar and non-planar data extracted, planar meshes and non-planar meshes generated, and so on. Functions of the components of the system 100 are explained in conjunction with the flow diagrams in FIG. 2 through FIG. 5, and the example figures in FIG. 6 and FIG. 7.

Figure 2:
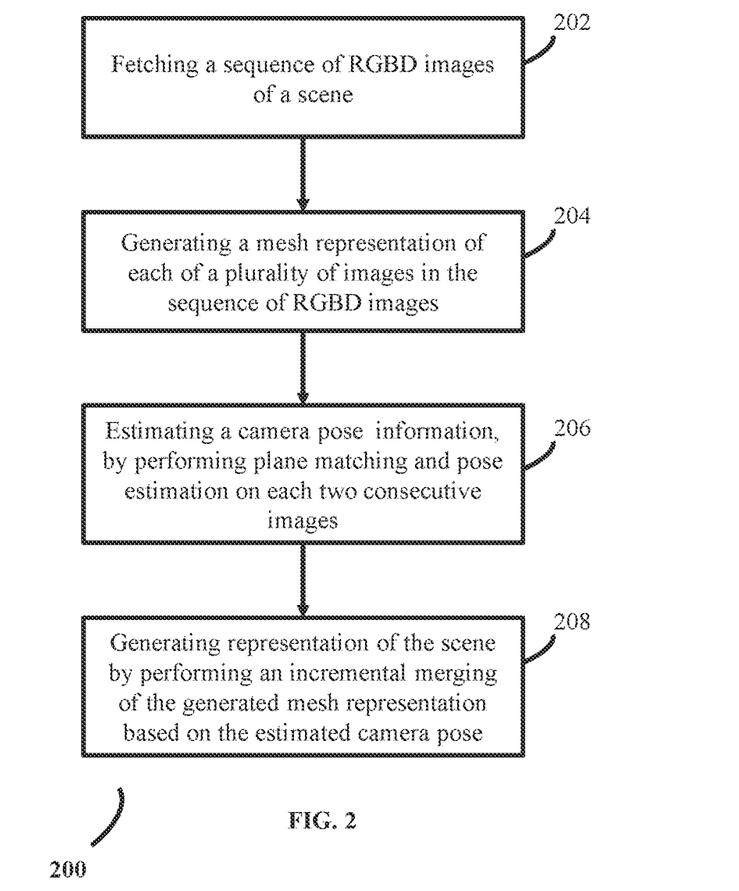
FIG. 2 is a flow diagram depicting steps involved in the process/method of mesh surface reconstruction of a scene, using the system of FIG. 1, according to some embodiments of the present disclosure.

FIG. 2 is a flow diagram depicting steps involved in the process of mesh surface reconstruction of a scene, using the system of FIG. 1, according to some embodiments of the present disclosure.

Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202, the system 100 fetches a sequence of RGBD images of a scene in which the image capturing means is deployed. For example, if the mesh surface reconstruction disclosed herein is used in robotic domain to for mesh surface reconstruction of a scene in which the robot is located, the image capturing means may be associated with the robot, and the sequence of RGBD images capture area/location/objects in field of view of the image capturing means used by the robot(s). It is to be noted that 'RGBD' type images being referred to in the embodiments disclosed herein are in state of the art RGBD format which captures colour information (RGB—'Red Green Blue') as well as depth (D) information. Further, at step 204, the system 100 generates a mesh representation of each of the plurality of images in the sequence of RGBD images. Steps involved in the process of generating the mesh representation are depicted in process 300 depicted in FIG. 3. Each of the RGBD images comprise planar point cloud as well as non-planar point cloud. Planar point cloud is for data/objects that lie in same plane, and the non-planar point cloud are the data/objects that do not lie in the same plane. At step 302, the system 100 segregates the planar point cloud and non-planar point cloud, from each of the images in the RGBD image sequence, by performing a plane segmentation. At this step, a segmented plane is generated. Further, the planar and non-planar point clouds are generated from the segmented plane, non-planar objects identified, and pose information. The system 100 may use any suitable technique for the plane segmentation. For example, a concept of PlaneRCNN that uses mask R-CNN for plane detection and segmentation is used by the system 100. PlaneRCNN is capable of handling any number of planes, in comparison with other techniques such as but not limited to PlaneNet, and planeRecover, which need prior information on maximum number of planes. After performing the plane segmentation, the system 100 calculates various plane parameters using a suitable technique. An example of the technique used for calculating the plane parameters is RANSAC in HNF (Hessian Normal Form), where a plane $\pi$ is represented by $[q_\pi, d_\pi]$. $q_\pi$ is unit normal vector $[q_x, q_y, q_z] \in IR^3$ on a plane and $d_\pi \in IR$ is distance of $\pi$ from origin of the plane.

Figure 3:
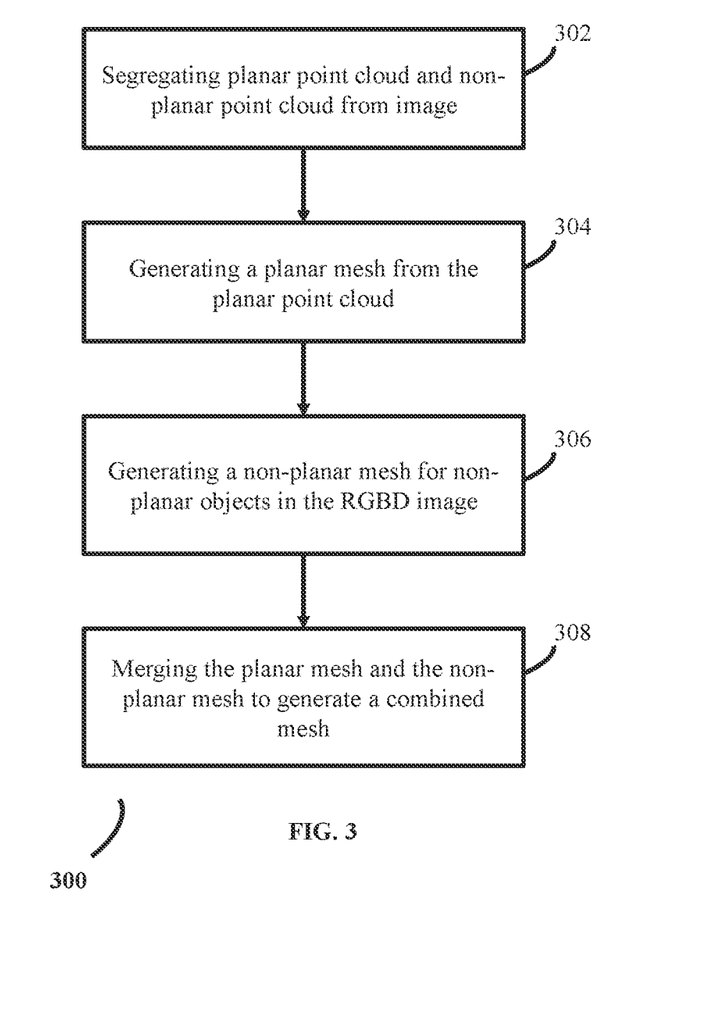
FIG. 3 is a flow diagram depicting steps involved in the process of generating a mesh representation for each image in a RGBD sequence of images, using the system of FIG. 1, in accordance with some embodiments of the present disclosure.

Further, at step 304, the system 100 generates a planar mesh from the planar point cloud. Algorithmic representation of a sequence of steps used to generate the planar mesh from the planar point cloud is given below:

---
(Alogorithm 1)

Require:- $q_\pi$, $d_\pi$, grid dimension $d_{grid}$, plane points [P]
Step 1: Calculate rotation $R_\pi$ between $q_\pi$ and z-axis $A_z$ $$R = I + [V]_X + [V]_X^2 \frac{1}{1+C}$$

where, I is identity matrix.
  $v = A_z * q_\pi$
  $c = A_z \cdot q_\pi$
$[V]_X$ is skew symmetric matrix of V
Step 2: Rotate all points $[P] \in IR^3$ on $\pi$ using $R_\pi$
  $[P]_{rot} = R_\pi[P]$
Step 3: Due to the rotation at step 2, $\pi$ is parallel to xy plane, hence at step 3, the x, y coordinates of $[P]_{rot}$ are projected to the plane in $IR^2$ as:
  $I_\pi = Project([P]_{rot})$
Step 4: create a diagonal grid $G \in IR^2$ with dimension $d_{grid}$ of each grid
Step 5: Fit the grid G on $I_\pi$
Step 6: for all Triangle $g \in G$ do
  Step 7: if g is 75% fill foreground pixels then
    Step 8: keep g
  Step 9: else
    Step 10: discard g
  Step 11: end if
Step 12: end for
Step 13: END

---

By using the algorithm 1, which is a cartesian grid based mesh fitting algorithm, the system 100 calculates a rotation matrix for each plane in the planar point cloud being processed. The system 100 then obtains a 2-D image by aligning each of the planes in the planar point cloud parallel to an X-Y plane, by rotating each of the planes with respect to the X-Y plane based on values in the rotation matrix. Further, the planar mesh is obtained from the 2-D image. In algorithm 1, by controlling $d_{grid}$, the system 100 controls quality of the generated mesh from coarse to finer.

Figure 4:
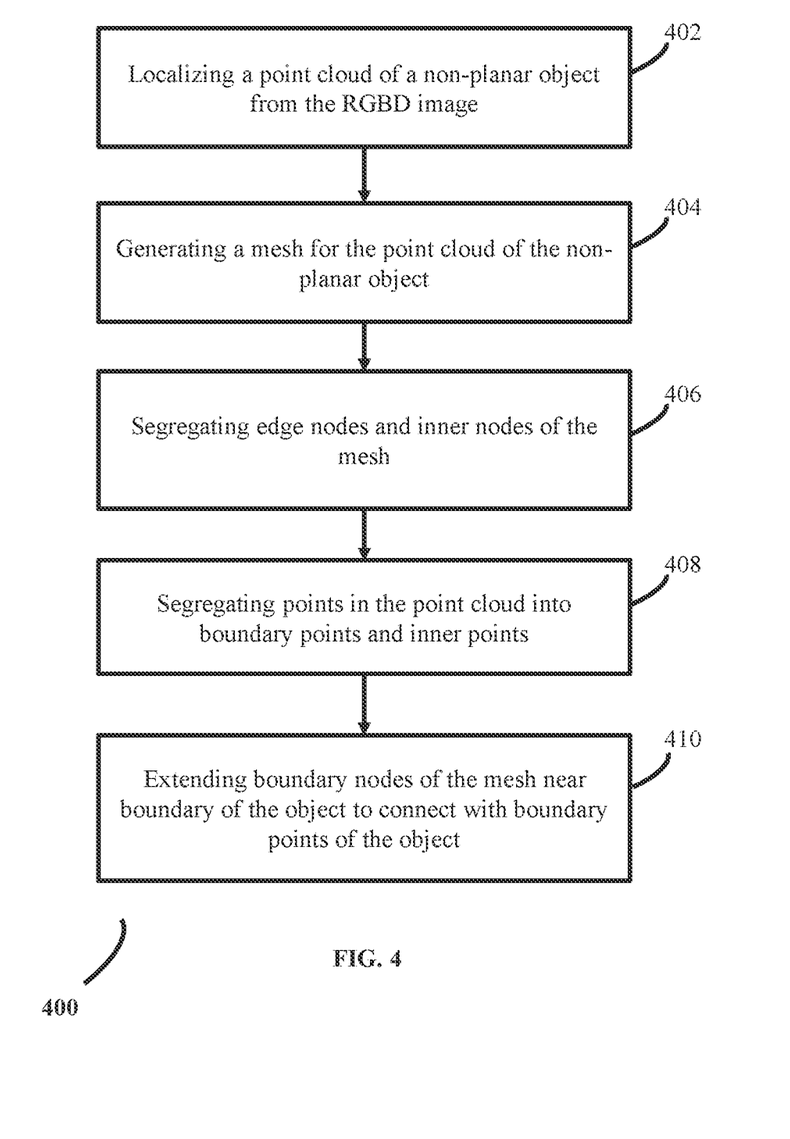
FIG. 4 is a flow diagram depicting steps involved in the process of generating a non-planar mesh for non-planar objects in the image, using the system of FIG. 1, according to some embodiments of the present disclosure.
Figure 5:
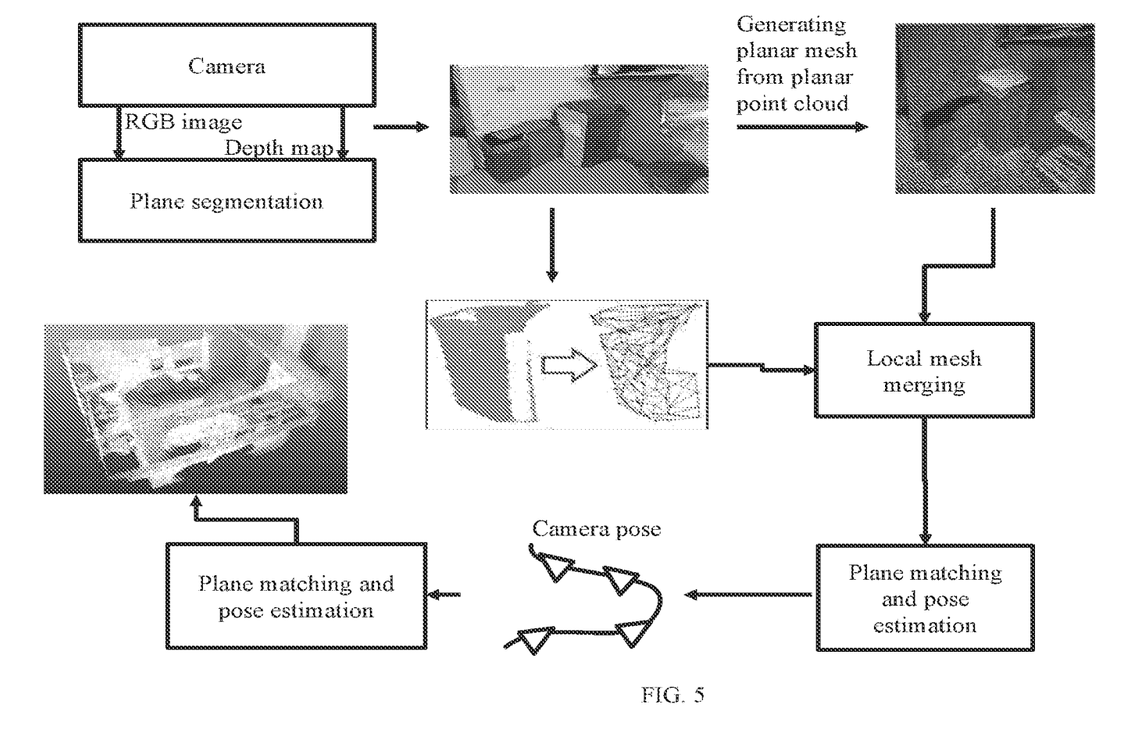
FIG. 5 is a functional flow diagram of the process of mesh surface reconstruction of a scene, using the system of FIG. 1, according to some embodiments of the present disclosure.
Figure 6A:
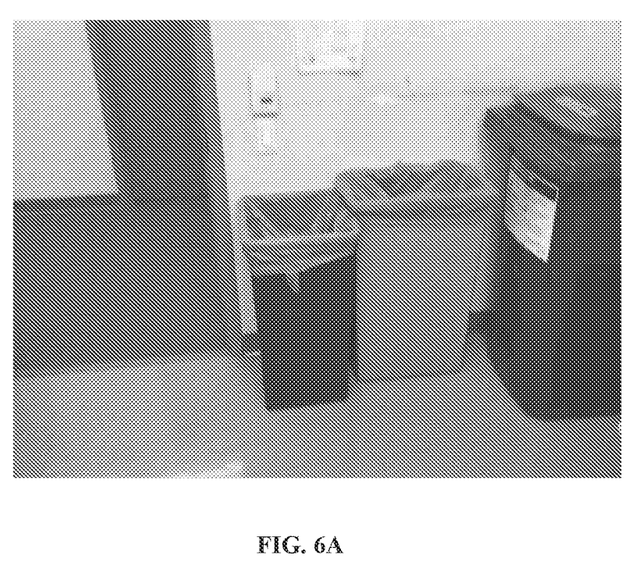
FIG. 6A is a first example diagram depicting steps of approximation of each RGBD image, by the system of FIG. 1, according to some embodiments of the present disclosure.
Figure 6B:
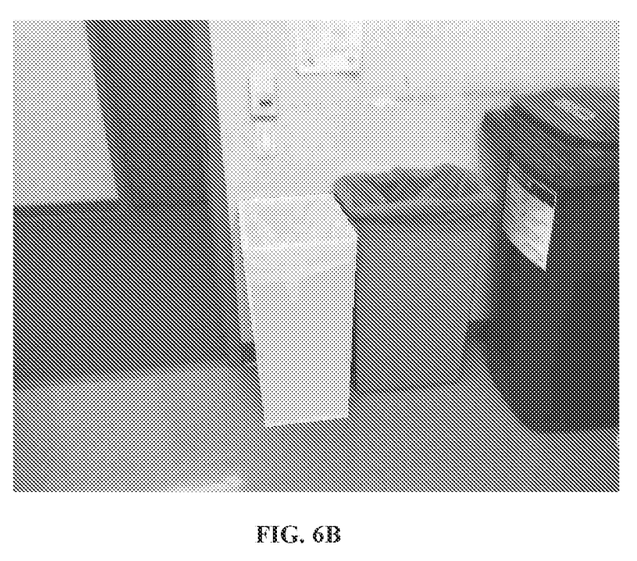
FIG. 6B is a second example diagram depicting steps of approximation of each RGBD image, by the system of FIG. 1, according to some embodiments of the present disclosure.
Figure 6C:
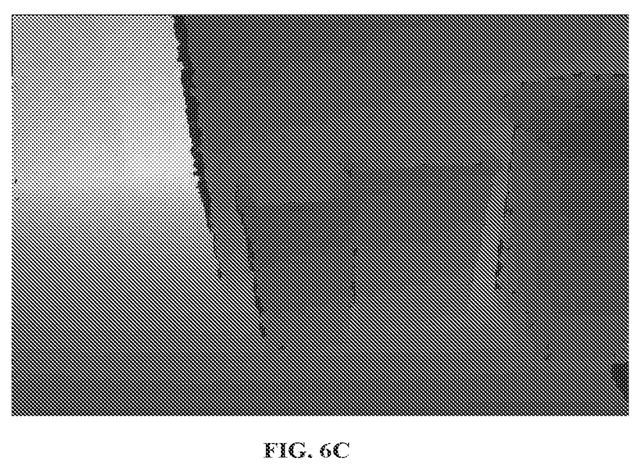
FIG. 6C is a third example diagram depicting steps of approximation of each RGBD image, by the system of FIG. 1, according to some embodiments of the present disclosure.
Figure 6D:
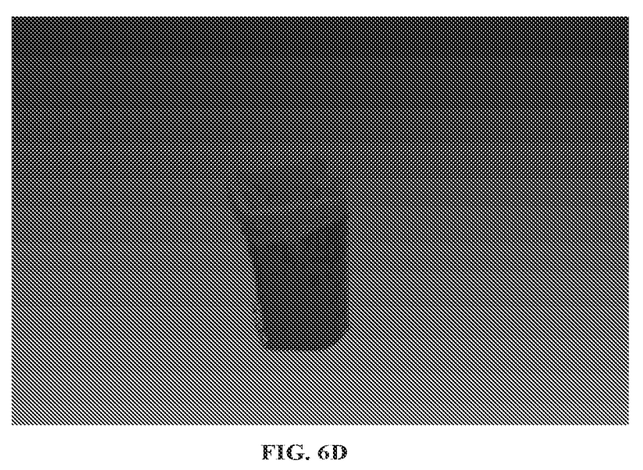
FIG. 6D is a fourth example diagram depicting steps of approximation of each RGBD image, by the system of FIG. 1, according to some embodiments of the present disclosure.
Figure 6E:
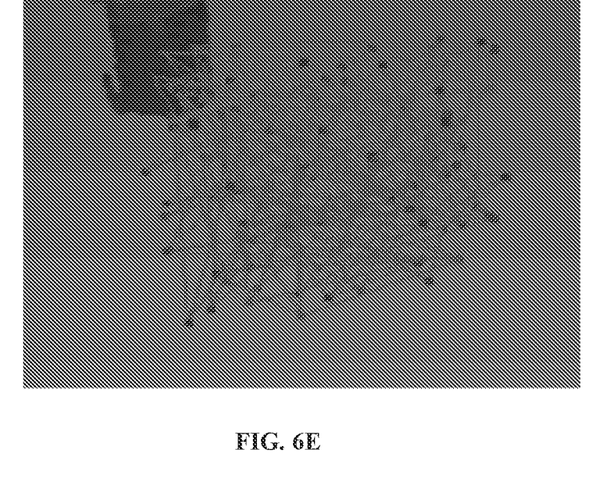
FIG. 6E is a fifth example diagram depicting steps of approximation of each RGBD image, by the system of FIG. 1, according to some embodiments of the present disclosure.
Figure 6F:
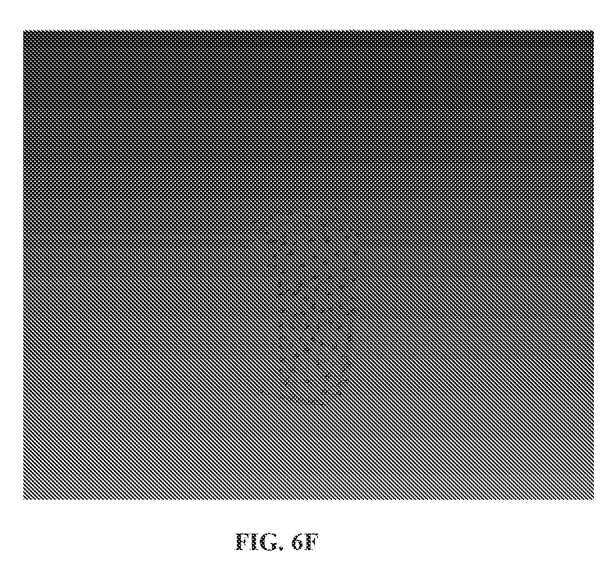
FIG. 6F is a sixth example diagram depicting steps of approximation of each RGBD image, by the system of FIG. 1, according to some embodiments of the present disclosure.
Figure 7A:
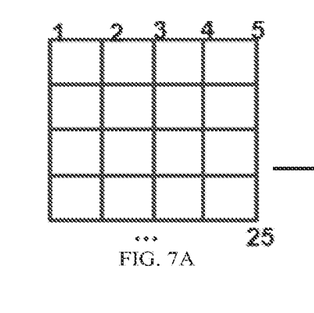
FIG. 7A depicts a first example diagram of steps in mesh surface reconstruction, by the system of FIG. 1, according to some embodiments of the present disclosure.
Figure 7B:
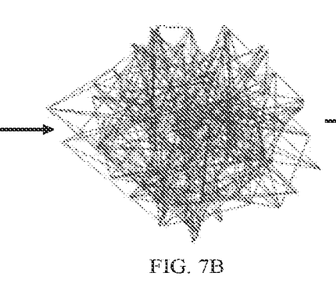
FIG. 7B depicts a second example diagram of steps in mesh surface reconstruction, by the system of FIG. 1, according to some embodiments of the present disclosure.
Figure 7C:
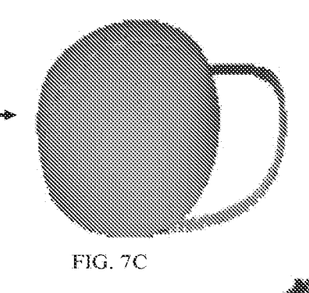
FIG. 7C depicts a third example diagram of steps in mesh surface reconstruction, by the system of FIG. 1, according to some embodiments of the present disclosure.
Figures 7D, 7E:
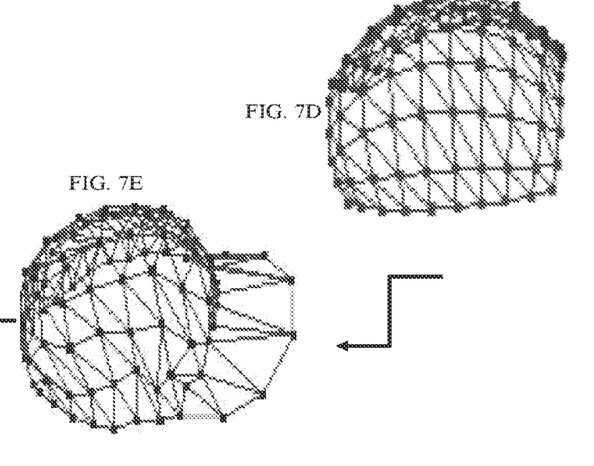
FIG. 7D depicts a fourth example diagrams of steps in mesh surface reconstruction, by the system of FIG. 1, according to some embodiments of the present disclosure.
FIG. 7E depicts a fifth example diagrams of steps in mesh surface reconstruction, by the system of FIG. 1, according to some embodiments of the present disclosure.
Figure 7F:
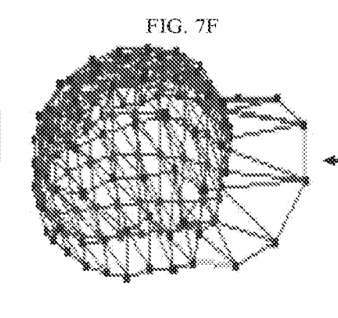
FIG. 7F depicts a sixth example diagrams of steps in mesh surface reconstruction, by the system of FIG. 1, according to some embodiments of the present disclosure.
Figure 7G:
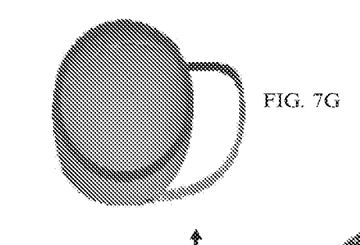
FIG. 7G depicts a seventh example diagrams of steps in mesh surface reconstruction, by the system of FIG. 1, according to some embodiments of the present disclosure.

Further, at step 306, the system 100 generates a non-planar mesh from the non-planar point cloud. Various steps involved in the process of generating the non-planar mesh for the non-planar objects in the image are depicted in FIG. 4. The non-planar point cloud may contain information on a plurality of the non-planar objects. The system 100 approximates object surface of each of these non-planar objects by executing process 400. At step 402, the system 100 localizes a point cloud of each of the objects from the non-planar data, wherein the objects being referred to in the context of the non-planar mesh generation are non-planar objects. In an embodiment, the point cloud for the object is generated by the system 100. To generate the point cloud, the system 100 applies a suitable object segmentation method (such as RCNN) on the image, and the object segmentation method in return provides a mask of the object. The system 100 then uses the mask to segment out the point cloud of the object, given the RGBD image sequence and pose of each of the images. The pose of the images may be estimated by using any suitable off-the-shelf Simultaneous Localization and Mapping (SLAM) technique.

Further at step 404, the system 100 generates a mesh for the fetched point cloud. The system 100 may use a suitable technique/algorithm such as Self Organizing Map (SOM). The generated mesh contains a plurality of nodes, out of which, some are boundary nodes and the remaining are inner nodes. The number of nodes in the mesh may be fixed, and the nodes are connected through predefined set of connections. At step 406, the system 100 segregates the boundary nodes and the inner nodes of the mesh. Similarly, in the point cloud of the object, some points are boundary points and the rest are inner points. The boundary points are the points for which nearest mesh node is a boundary node, and the remaining points are inner points. At step 408, the system 100 segregates the boundary points and the inner points of the point cloud. Further, at step 410, the system 100 extents the boundary nodes of the mesh near boundary of the object to connect with the boundary points of the object. The resulting mesh after extending the boundary nodes to connect with the boundary points of the object form the non-planar mesh. The system 100 controls extension of the boundary nodes of the mesh, by controlling learning rate and elasticity of the boundary nodes (as in steps 9 and 10 of Algorithm 2).

Algorithmic representation of steps in the process of generating the non-planar mesh are given below:

---
Algorithm 2

Step 1: Apply $N_1$ iterations of SOM on point cloud X to generate mesh having M nodes
Step 2: Find a set XB of boundary input points $xb \in XB$ such that winning node i(xb) is a boundary node. $XB \subset X$. $i(xb) = \arg\min_j \|xb - w_j\|$, $j = 1, \ldots, M$.
Step 3: for $n = 1, \ldots N$ do
Step 4: $n = n + N/2$ /* initiate $\eta(n)$ and $\sigma(n)$ with decreased value */
Step 5: for $p = 1, \ldots, l$ do
Step 6:   Sampling: randomly draw a sample x from X
Step 7:   Find winning node i(x) using a minimum distance
      Euclidean criteria $i(x) = \arg\min_j \|x(p) - w_j\|$, $j = 1, \ldots, M$
Step 8: if $x \in XB$ then
Step 9: $\eta(n) = \eta(n) * 2.5$ /* increase learning rate of the boundary nodes */
Step 10: $\sigma(n) = \sigma(n)/2$ /* decrease elasticity of the boundary nodes */
Step 11: Updating: Update weights of all nodes of the mesh as
      $w_j(p + 1) = w_j(p) + \eta(n)h_{j,i(x)}(n)(x(p) - w_j(p))$, $j = 1, \ldots, M$, where $\eta(n)$ and $h_{j,i(x)}(n)$ are learning rate parameter and neighborhood function centered at winning node i(x) respectively, and both parameters decay with time.
Step 12: $\eta(n) = \eta(n) * 2.5$
Step 13: $\sigma(n) = \sigma(n)/2$ Algorithm 2

Step 14: Else
Step 15: Updating: Update weights of all nodes as $w_j(\rho + 1) =$
    $w_j(\rho) + \eta(n)h_{j,i(x)}(n) (x(\rho) - w_j(\rho)), j = 1, \ldots M$
Step 16: end if
Step 17: end for
Step 18: $\eta(n) = n^{-0.2} * \xi(n)$, where $\xi(n) = 1 - \exp(5(n - N)/N)$
Step 19: $\sigma(n) = \sigma N + \xi(n) (\sigma 0 * 0.05^{n/N} - \sigma N) * n^{-0.25}$
Step 20: end for For explanation process, consider that the point cloud of the object being considered consists of I points represented as $X=\{x_i \in R^3\}, i=1, \ldots, 1$, the 2D lattice consists of $M=m*m$ nodes where the set of nodes is represented by set of weight nodes $W=\{w_j \in R^3\}, j=1, \ldots, M$. $x_i$ acts as activation pattern. Given $x_i$, the nodes $w_j$ compete among each other, and a node emerges as winning node. The winning node $i(x)$ learns the pattern of $x_i$ following a learning rate $\eta(n)$ and cooperated with neighboring nodes for learning. Neighborhood of a node is defined as $h_{j,i(x)}(n)=\exp(-d^2/2\sigma^2(n))$, where d is Euclidean distance between $i(x)$ and $j^{th}$ node, $\sigma$ is spread, and $\eta$ is epoch number. A number of epochs N arranges the nodes of the 2D lattice such that it covers surface of the object.

Figure 8A:
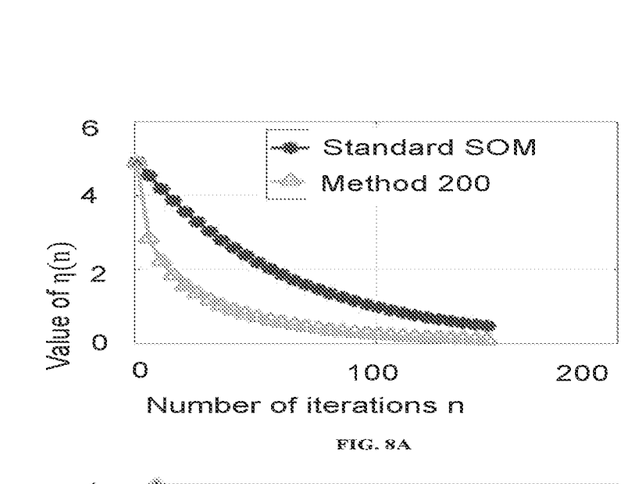
FIGS. 8A and 8B are graphs depicting comparison of decay functions η(a) and σ(b) for a state-of-the-art technique and the method used by the system of FIG. 1, according to some embodiments of the present disclosure.
Figure 8B:
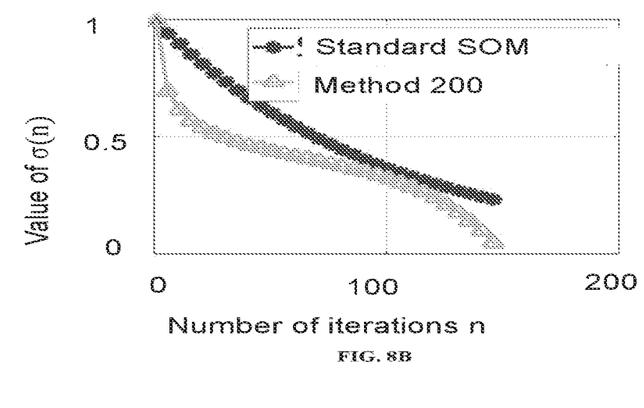

As can be seen in the algorithm 2, the learning rate and the elasticity of the mesh nodes are controlled such that the boundary nodes move freely, almost independently of the inner nodes. This in turn helps to preserve shape of the mesh while extending the boundary nodes to cover the object. The step of covering the point cloud using the mesh is performed in multiple iterations. To accelerate the results, the system 100 may keep the learning rate and the spread high initially. The system 100 automatically determines the values of the learning rate and spread, at each iteration, using step 18 and step 19 of algorithm 2. Further, with each iteration, both the learning rate and the spread are decreased, so that the structure of the mesh obtained as a result of previous iterations is not diminished in subsequent iterations. Further, in a convergence phase, the system 100 decreases value of a at a faster rate. The system 100 uses the following decay functions to control the learning and spread respectively:

$\eta(n)=n^{-0.2}*\xi(n)$, where $\xi(n)=$
$1-\exp(5(n-N)/N)\sigma(n)=\sigma N+\xi(n)$
$(\sigma 0*0.5^{n/N}-\sigma N)*n^{-0.25}$ Here, $\xi(n)=1-\exp(5(n-N)/N)$, $\sigma 0$ and $\sigma N$ represent desired spread of neighborhood function at iteration 0 and iteration N respectively. For example, for a 10*10 lattice of mesh, the values may be set as $\sigma 0=5$ and $\sigma N=0.5$, and $N=5$. For every subsequent iteration, the values of the learning rate and the spread are selected such that shape of the mesh and the inner nodes obtained after previous iterations are not affected. A comparison of decay functions used for used $\eta$ and $\sigma$ in the process 200 and in conventional SOM technique is given in FIGS. 8A and 8B. It can be observed from FIGS. 8A and 8B that $\eta$ decreases faster towards end of iterations, and value of $\sigma$ is less at a phase in which the mesh approximates a point cloud of the object.

To further refine the shape of the mesh in local areas having sudden change in normal, the following steps are carried out. For any given point cloud, 'normal' for each point can be calculated using any suitable technique. Any abrupt change in normal along a 3D surface may indicate that the surface is not smooth, and is being referred to as 'sudden change in normal' in this context. After running the algorithm 2, for each node w, the set $X'=\{x_i, i=1, \ldots, r:$ $x_i \in X$, $w=\arg\min_j \|x_i - w_j\|, j=1, \ldots, M\}$. Then an average value is obtained as $x'=\sum_{i=1}^{r} x_i/|x_i|$. if Euclidean distance between x' and w is less than a threshold, then the system 100 applies a suitable technique (for example, As-rigid-as-possible (ARAP) shape manipulation) keeping w as source, and x' as destination.

After generating the planar mesh and the non-planar mesh, at step 308, the system 100 merges the planar mesh and the non-planar mesh to generate a combined mesh. The combined mesh acts as a mesh representation of the image. Using the same approach, the mesh representation is improved incrementally using point cloud information extracted from each of the images in the sequence of RGBD images.

Further, at step 206, the system 100 estimates a camera pose information, by performing plane matching and pose estimation on each two consecutive images in the sequence of RGBD images. In an embodiment, the camera pose information is estimated before mesh generation, so that the same can be used for generating the planar and non-planar point clouds. While performing the plane matching and pose estimation, the system 100 matches planes between each two consecutive images in the sequence of RGBD images, based on the segregated planar point cloud, and based on the matching of planes, the system 100 determines a relative pose between the consecutive images.

Further, at step 208, the system 100 generates a representation of the scene by performing an incremental merging of the generated mesh representation of the plurality of images in the sequence of RGBD images, based on the estimated camera pose information. The generated representation of the scene may be then used for various applications. For example, if the aforementioned application in robotics domain is considered, the generated representation of the scene may be used by the robots to perform navigation, and/or to identify objects in the scene and so on. The steps in process 200 are also depicted in the process flow diagram in FIG. 5. In this process flow diagram, 'local mesh merging' refers to the step 308. Further, the steps in mesh approximation are depicted in the example FIGS. 6A through 6F. 6A depicts input RGBD image. 6B depicts result of the segmentation of the planes in the input RGBD image. 6C depicts depth map of the input RGBD image. Point cloud of the object extracted from 6B and 6C of the input RGBD image is depicted in 6D. 6E shows initialization of the mesh nodes, and 6F shows approximated mesh/the mesh representation generated at step 208.

Various steps in the process 200 may be performed in the same order as depicted in FIG. 2 or in any alternate order which is technically feasible. In another embodiment, one or more steps in the process 200 may be omitted.

Experimental Results:

a) Datasets: Three known datasets were used to evaluate out pipeline and the individual components. The datasets are a) ScanNet datset, which is used for plane segmentation, b) ShapeNet dataset, which is used for non-planar objects, and c) Apt0, Copyroom, and Office3 datasets for the entire pipeline evaluation. All the experiments were done with respect to a Double2 robot mounted with a RealSense camera for RGBD data. The pipeline was run on an edge device connected to the robot having single-core CPU and 6 GB RAM. No GPU support was needed, hence direct integration to any robotic platform was possible.

b) Results on 3D mesh creation for non-planar objects: To test the efficacy of the Algorithm 2, extensive experiments were conducted, both qualitative and quantitative, on two types of data. The first type consisted of object point clouds extracted from real RGBD images (Copyroom and Office3 datasets). The second type consisted of object point clouds taken from CAD models (ShapeNet dataset). Whereas, the point clouds from the CAD model were expected to be ideal with no noise or hole, the point clouds extracted from RGBD images were expected to contains noise, holes and uneven density of points. Algorithm 2 was identified as smoothening the noise, filling the holes and working well for uneven density. The run time of algorithms 1 and 2 were proportional to size of the input point cloud. Therefore, to reduce the size while preserving the shape and topology of the input point cloud, voxel grid filter was applied. This filtering also helped in tackling the issue of uneven density of input point clouds. The results obtained by the system 100 was compared with a state-of-the-art approach which also utilizes SOM. From the results, it was observed that the method 200 better approximated the surface shapes of the input objects. The results also indicated that the method 200 stretched the mesh boundary to the object boundary better as compared to state-of-the-art techniques. Two quantitative metrics assessed during the experiments were defined as follows. Accuracy: distance d such that a given percentage of the reconstruction is within d from a ground truth model. Completeness: percentage of the ground truth model that is within a given distance from the reconstruction. For accuracy, the percentage was defined as 90%. Different point clouds can be in different scales. Therefore, for completeness, the given distance was defined as one tenth of the maximum distance between any two points along x, y and z axis. Note that smaller the value of accuracy, the better it is. Similarly, bigger the value of completeness, the better it is.

c) Final mesh results: The generated representation of the scene (also referred to as world model) containing planar and non-planar object meshes generated by method 200 was identified as holding structural property of the environment, hence is identified as suitable for applications such as but not limited to remote virtual navigation and manipulation. Comparison of results obtained using SOM and the method 200 are depicted in FIGS. 7A through 7G. A schematic diagram of a 2D 5*5 lattice of the mesh nodes is depicted in 7A. 7B depicts a 10*10 mesh after initialization. 7C is point cloud of an object (a cap in this example). Result obtained using SOM is depicted in 7D. As can be seen in 7D, the mesh is not completely covering shape of the point cloud of the object, hence is not giving an accurate result. However, when the process 200 was used, the mesh nodes extent to overlay the boundaries of the point cloud, as can be seen from 7E through 7G.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of mesh reconstruction of a scene. The embodiment, thus provides a method and system for constructing planar mesh and non-planar mesh using planar point cloud and non-planar point cloud extracted from images of a scene. Moreover, the embodiments herein further provide a mechanism of generating mesh representation of a scene, using the planar point cloud and non-planar point cloud from the images.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of mesh surface reconstruction of a scene comprising:
fetching a sequence of RGBD images of the scene, via one or more hardware processors;
generating a mesh representation of each RGBD image in the sequence of RGBD images, via the one or more hardware processors, wherein generating the mesh representation for each of the RGBD images comprises:
segregating a planar point cloud and a non-planar point cloud from the RGBD image by performing a plane segregation on the RGBD image, wherein the planar point comprises objects that lie in same plane, and the non-planar point cloud comprises objects that do not lie in the same plane;
generating a planar mesh from the planar point cloud;
generating a non-planar mesh from the non-planar point cloud, wherein generating the non-planar mesh from the non-planar point cloud, comprises:
localizing a point cloud of a non-planar object from the RGBD image;
generating a mesh for the point cloud of the non-planar object;
segregating boundary nodes and inner nodes of the mesh;
segregating a plurality of points in the point cloud of the object into boundary points and inner points, wherein for each of the boundary points nearest mesh node of the generated mesh is a boundary node and for each of the inner points nearest mesh node is an inner node; and
extending the boundary nodes of the mesh near the boundary of the object to connect with the boundary points of the object; and
merging the planar mesh and the non-planar mesh to generate a combined mesh, wherein the combined mesh acts as a mesh representation of the RGBD image;
estimating a camera pose information, by performing plane matching and pose estimation on each two consecutive images in the sequence of RGBD images via the one or more hardware processors, wherein performing the plane matching and pose estimation comprises:
matching planes between each two consecutive images in the sequence of RGBD images, based on the segregated planar data;
determining a relative pose between the two consecutive images; and
performing an incremental merging of the generated mesh representation of the plurality of images using the estimated camera pose information, to generate a representation of the scene captured in the sequence of RGBD images, via the one or more hardware processors.

2. The method of claim 1, wherein performing the plane matching and pose estimation comprises:
matching planes between each two consecutive images in the sequence of RGBD images, based on the segregated planar data; and
determining a relative pose between the two consecutive images.

3. The method of claim 1, wherein generating the planar mesh from the planar point cloud comprises:
calculating a rotation matrix for each plane in the planar point cloud;
obtaining a 2-D image by aligning each of the planes in the planar point cloud parallel to an X-Y plane, by rotating each of the planes with respect to the X-Y plane based on values in the rotation matrix; and
obtaining the planar mesh from the 2-D image.

4. A system for mesh surface reconstruction of a scene, comprising:
one or more hardware processors;
an I/O interface; and
a memory, wherein the memory stores a plurality of instructions, which when executed, cause the one or more hardware processors to:
fetch a sequence of RGBD images of the scene;
generate a mesh representation of each RGBD image in the sequence of RGBD images, wherein generating the mesh representation for each of the RGBD images comprises:
segregating a planar point cloud and a non-planar point cloud from the image by performing a plane segregation on the RGBD image;
generating a planar mesh from the planar point cloud;
generating a non-planar mesh from the non-planar point cloud, wherein generating the non-planar mesh from the non-planar point cloud, comprises:
localizing a point cloud of a non-planar object from the RGBD image;
generating a mesh for the point cloud of the non-planar object;
segregating boundary nodes and inner nodes of the mesh;
segregating a plurality of points in the point cloud of the object into boundary points and inner points, wherein for each of the boundary points nearest mesh node of the generated mesh is a boundary node and for each of the inner points nearest mesh node is an inner node; and
extending the boundary nodes of the mesh near the boundary of the object to connect with the boundary points of the object; and
merging the planar mesh and the non-planar mesh to generate a combined mesh;
estimate a camera pose information, by performing plane matching and pose estimation on each two consecutive images in the sequence of RGBD images; and
perform an incremental merging of the generated mesh representation of the plurality of images using the estimated camera pose information, to generate a representation of the scene captured in the sequence of RGBD images.

5. The system as claimed in claim 4, wherein the system performs the plane matching and pose estimation by:

matching planes between each two consecutive images in the sequence of RGBD images, based on the segregated planar point cloud; and determining a relative pose between the two consecutive images.

6. The system as claimed in claim 4, wherein the system generates the planar mesh from the planar data by:

calculating a rotation matrix for each plane in the planar point cloud;

obtaining a 2-D image by aligning each of the planes in the planar point cloud parallel to an X-Y plane, by rotating each of the planes with respect to the X-Y plane based on values in the rotation matrix; and obtaining the planar mesh from the 2-D image.

7. One or more non-transitory machine-readable information storage mediums comprising one or more instructions which when executed by one or more hardware processors cause:

fetching a sequence of RGBD images of the scene, via one or more hardware processors;

generating a mesh representation of each RGBD image in the sequence of RGBD images, via the one or more hardware processors, wherein generating the mesh representation for each of the RGBD images comprises:

segregating a planar point cloud and a non-planar point cloud from the RGBD image by performing a plane segregation on the RGBD image;

generating a planar mesh from the planar point cloud;

generating a non-planar mesh from the non-planar point cloud; and merging the planar mesh and the non-planar mesh to generate a combined mesh;

estimating a camera pose information, by performing plane matching and pose estimation on each two consecutive images in the sequence of RGBD images via the one or more hardware processors; and performing an incremental merging of the generated mesh representation of the plurality of images using the estimated camera pose information, to generate a representation of the scene captured in the sequence of RGBD images, via the one or more hardware processors.

8. The one or more non-transitory machine-readable information storage mediums of claim 7, wherein performing the plane matching and pose estimation comprises:

matching planes between each two consecutive images in the sequence of RGBD images, based on the segregated planar data; and determining a relative pose between the two consecutive images.

9. The one or more non-transitory machine-readable information storage mediums of claim 7, wherein generating the planar mesh from the planar point cloud comprises:

calculating a rotation matrix for each plane in the planar point cloud;

obtaining a 2-D image by aligning each of the planes in the planar point cloud parallel to an X-Y plane, by rotating each of the planes with respect to the X-Y plane based on values in the rotation matrix; and obtaining the planar mesh from the 2-D image.

\* \* \* \* \*